(12) United States Patent
Fu

(10) Patent No.: US 9,448,899 B2
(45) Date of Patent: Sep. 20, 2016

(54) METHOD, APPARATUS AND SYSTEM FOR SWITCHING OVER VIRTUAL APPLICATION TWO-NODE CLUSTER IN CLOUD ENVIRONMENT

(71) Applicant: Huawei Technologies Co., Ltd., Shenzhen (CN)

(72) Inventor: Caibin Fu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 141 days.

(21) Appl. No.: 14/464,272

(22) Filed: Aug. 20, 2014

(65) Prior Publication Data
US 2014/0359343 A1    Dec. 4, 2014

Related U.S. Application Data

(63) Continuation of application No. PCT/CN2012/080318, filed on Aug. 17, 2012.

(51) Int. Cl.
*G06F 11/20* (2006.01)
*G06F 11/30* (2006.01)
*G06F 11/14* (2006.01)

(52) U.S. Cl.
CPC ......... *G06F 11/2033* (2013.01); *G06F 11/301* (2013.01); *G06F 11/1484* (2013.01);
(Continued)

(58) Field of Classification Search
CPC .................. G06F 11/2069; G06F 11/2094
USPC ................................. 714/4.11, 6.3
See application file for complete search history.

(56) References Cited

U.S. PATENT DOCUMENTS 7,945,724 B1 * 5/2011 Smith .................... G06F 3/061
                                                          365/185.33
2005/0102559 A1    5/2005 Hyytianen
(Continued)

FOREIGN PATENT DOCUMENTS

| CN | 1879088 A | 12/2006 |
| CN | 101807985 A | 8/2010 |
| CN | 102231681 A | 11/2011 |
| CN | 102346779 A | 2/2012 |
| EP | 1914620 A2 | 4/2008 |
| WO | 2010119125 A1 | 10/2010 |

OTHER PUBLICATIONS

Partial English Translation and Abstract of Chinese Patent Application No. CN101807985A, Part 1, Nov. 3, 2014, 5 pages.
(Continued)

*Primary Examiner* — Chae Ko
(74) *Attorney, Agent, or Firm* — Conley Rose, P.C.; Grant Rodolph

(57) ABSTRACT

A method for switching over a virtual application two-node cluster in a cloud environment, including: sending an association state of a shared EBS volume to the standby virtual machine; receiving a request for removing an association between the active virtual machine and the shared EBS volume; removing the association between the active virtual machine and the shared EBS volume; receiving a request for associating the shared EBS volume sent by the standby virtual machine; and associating the standby virtual machine with the shared EBS volume. A brain-split problem can be completely solved using the method and an apparatus disclosed in the embodiments of the present invention. In addition, dependence on a reference active node is no longer required, which can simplify deployment of an application two-node cluster and improve reliability of the application two-node cluster.

14 Claims, 6 Drawing Sheets

(52) U.S. Cl.
CPC ........ *G06F11/2025* (2013.01); *G06F 11/2038* (2013.01); *G06F 11/2046* (2013.01); *G06F 2201/815* (2013.01); *G06F 2201/85* (2013.01)

(56) References Cited

U.S. PATENT DOCUMENTS

| | | |
|---|---|---|
| 2006/0256106 A1 | 11/2006 | Scarlata et al. |
| 2009/0132708 A1* | 5/2009 | Hayward .............. G06F 9/5055 709/226 |
| 2011/0208908 A1 | 8/2011 | Chou et al. |
| 2011/0213753 A1 | 9/2011 | Manmohan |
| 2011/0252420 A1* | 10/2011 | Tung ..................... G06F 9/5072 718/1 |
| 2012/0102135 A1 | 4/2012 | Srinivasan et al. |
| 2015/0331635 A1* | 11/2015 | Ben-Shaul ............ G06F 9/5061 711/120 |
| 2016/0048408 A1* | 2/2016 | Madhu ................ G06F 11/1458 718/1 |
| 2016/0050282 A1* | 2/2016 | Olson .................... H04L 67/16 709/201 |

OTHER PUBLICATIONS

Partial English Translation and Abstract of Chinese Patent Application No. CN101807985A, Part 2, Nov. 3, 2014, 3 pages.
Foreign Communication From A Counterpart Application, PCT Application No. PCT/CN2012/080318, English Translation of International Search Report dated May 23, 2013, 3 pages.
Foreign Communication From A Counterpart Application, PCT Application No. PCT/CN2012/080318, Written Opinion dated May 23, 2013, 3 pages.
Foreign Communication From A Counterpart Application, Chinese Application No. 201280000892.4, Chinese Office Action dated Aug. 14, 2014, 3 pages.
Foreign Communication From A Counterpart Application, Chinese Application No. 201280000892.4, Chinese Search Report dated Aug. 6, 2014, 2 pages.
Foreign Communication From A Counterpart Application, European Application No. 12882921.5, Extended European Search Report dated Feb. 9, 2015, 6 pages.

* cited by examiner

METHOD, APPARATUS AND SYSTEM FOR SWITCHING OVER VIRTUAL APPLICATION TWO-NODE CLUSTER IN CLOUD ENVIRONMENT

CROSS-REFERENCE TO RELATED APPLICATIONS

This application is a continuation of International Application No. PCT/CN2012/080318, filed on Aug. 17, 2012, which is hereby incorporated by reference in its entirety.

TECHNICAL FIELD

The present invention relates to the field of communications technologies, and in particular, to a method, an apparatus, and a system for switching over a virtual application two-node cluster in a cloud environment.

BACKGROUND

For an application two-node cluster whose active node and standby node share a disk in a current physical environment, two-node cluster software is installed on two machines respectively and one shared disk is partitioned using an fibre channel storage area network (FC-SAN) or an Internet Protocol storage area network (IP-SAN), where access to the disk is limited to only two specified physical machines. The shared disk is regarded as a group of resources and controlled by the two-node cluster software (for example, a Veritas Cluster Server). During a switchover of two nodes in the application two-node cluster in warm standby or cold standby mode, the shared disk is mounted to the originally standby node only after it is unmounted from the originally active node to ensure that only one machine operates the shared disk at a time.

A physical two-node cluster system in the prior art is managed by an independent component. When the two-node cluster is incorrectly configured, a brain-split problem, that is, data damage due to simultaneous access of the two nodes to the shared disk, may easily occur.

To avoid the brain-split problem of the two-node cluster system, the following solution is provided in the prior art. In addition to the two-node cluster, a machine is introduced as a reference active node. When heartbeat communication between the active node and the standby node is faulty, to identify an isolated node, both the active node and the standby node ping an IP address of the reference active node, and the one that fails to ping the IP address of the reference active node actively releases control over the disk.

A disadvantage of this solution is that, when the active node is powered off, a system core dump occurs, or a control program is abnormal, the active node cannot release control over the disk. As a result, the standby node cannot assume control over the shared disk to provide services, thereby causing a long-time service interruption. In addition, this solution requires that a reference active node be configured, while the reference active node may be an external application component, whose reliability is difficult to ensure.

SUMMARY

Embodiments of the present invention provide a method for switching over a virtual application two-node cluster in a cloud environment to solve a problem that a standby node cannot assume control over a shared disk when an active node cannot release control over the shared disk due to a fault, which further affects active/standby switchover of the two nodes.

An embodiment of the present invention provides a method for switching over a virtual application two-node cluster in a cloud environment, where the virtual application two-node cluster includes an active virtual machine and a standby virtual machine, and the method includes sending, by a cloud management platform, an association state of a shared elastic block store (EBS) volume to the standby virtual machine, receiving a request for removing an association between the active virtual machine and the shared EBS volume sent by the standby virtual machine, removing, by the cloud management platform, the association between the active virtual machine and the shared EBS volume, receiving a request for associating the shared EBS volume sent by the standby virtual machine, and associating the standby virtual machine with the shared EBS volume so that the standby virtual machine controls the shared EBS volume.

An embodiment of the present invention also provides a cloud management platform that is configured to switch over a virtual application two-node cluster in a cloud environment, including a sending module configured to send an association state of a shared EBS volume to the standby virtual machine, the receiving module, further configured to receive a request for removing an association between the active virtual machine and the shared EBS volume sent by the standby virtual machine, a disassociating module configured to remove, according to the request for removing the association between the active virtual machine and the shared EBS, which is received by the receiving module, the association between the active virtual machine and the shared EBS volume, where the receiving module is further configured to receive a request for associating the shared EBS volume sent by the standby virtual machine, and an associating module configured to associate, according to the request for associating the shared EBS volume with the standby virtual machine, which is received by the receiving module, the standby virtual machine with the shared EBS volume so that the standby virtual machine controls the shared EBS volume.

An embodiment of the present invention further provides a virtual application two-node cluster system in a cloud environment for switching over a virtual application two-node cluster in the cloud environment, where the system includes a cloud management platform, an active virtual machine, and a standby virtual machine, where the cloud management platform is configured to send an association state of a shared EBS volume to the standby virtual machine; the standby virtual machine is further configured to detect, according to the association state of the shared EBS volume sent by the cloud management platform, that the shared EBS volume is associated with the active virtual machine, and send a request for removing an association between the active virtual machine and the shared EBS volume to the cloud management platform; the cloud management platform is further configured to receive the request for removing the association between the active virtual machine and the shared EBS volume sent by the standby virtual machine, and remove the association between the active virtual machine and the shared EBS volume; the standby virtual machine is further configured to send to the cloud management platform a request for associating the shared EBS volume; the cloud management platform is further configured to associate, according to the request for associating the shared EBS volume sent by the standby virtual machine, the standby virtual machine with the shared EBS volume; and the standby virtual machine is further configured to locally mount the shared EBS volume so as to control the shared EBS volume.

By using the method for switching over a virtual application two-node cluster in a cloud environment, the cloud management platform, and the virtual application two-node cluster system according to the embodiments of the present invention, an application two-node cluster is virtualized so that a standby virtual machine can request, when an active virtual machine is faulty and cannot release control over a shared disk, a cloud management platform to disassociate the active virtual machine from the shared disk and further assume control over the shared disk to implement a switchover from the active virtual machine to the standby virtual machine, thereby improving running reliability of the application two-node cluster.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
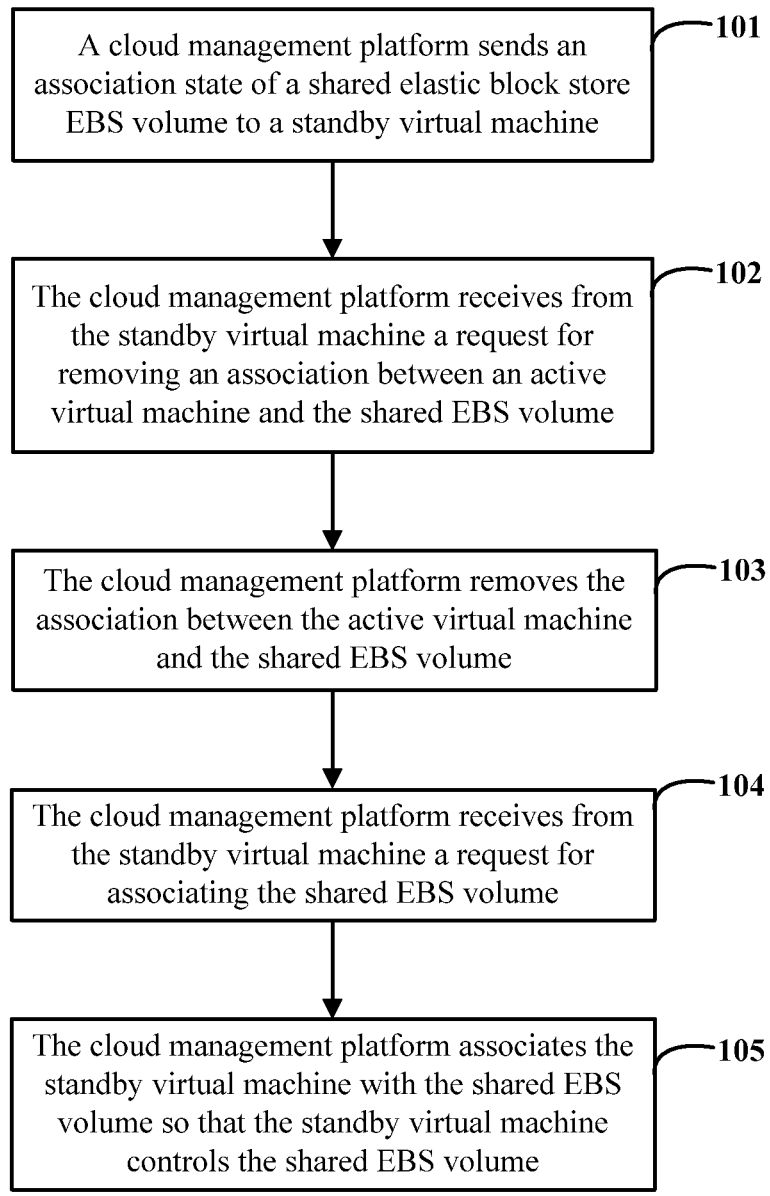
FIG. 1 is a schematic flowchart of a method for switching over a virtual application two-node cluster in a cloud environment according to an embodiment of the present invention.

FIG. 1 is a schematic flowchart of a method for switching over a virtual application two-node cluster in a cloud environment according to an embodiment of the present invention. In this embodiment of the present invention, the virtual application two-node cluster in the cloud environment includes an active virtual machine and a standby virtual machine. The following describes steps of the method in detail with reference to FIG. 1.

Step 101: A cloud management platform sends an association state of a shared EBS volume to the standby virtual machine.

In an embodiment of the present invention, that a cloud management platform sends an association state of a shared EBS volume to the standby virtual machine may be that when the active virtual machine is faulty, the cloud management platform receives a request for querying the association state of the shared EBS volume from the standby virtual machine, and the cloud management platform sends the association state of the shared EBS volume to the standby virtual machine according to the query request sent by the standby virtual machine.

During running of the virtual application two-node cluster, when the active virtual machine is faulty, a switchover from the active virtual machine to the standby virtual machine is caused. Because a shared disk in an application two-node cluster can be controlled by only one active machine at a time, the standby virtual machine first needs to acquire the association state of the shared EBS volume before the switchover, so as to avoid a case that both virtual machines of the virtual application two-node cluster are associated with the EBS volume.

In this embodiment of the present invention, the standby virtual machine may acquire the association state of the shared EBS volume in multiple manners. For example, the cloud management platform periodically sends association state information of the shared EBS volume to the standby virtual machine, the cloud management platform sends the association state information of the shared EBS volume to the standby virtual machine when detecting that the active virtual machine is faulty (for example, the active virtual machine is faulty, a network connection of the active virtual machine is faulty, or a host machine of the active virtual machine is faulty), or the standby virtual machine sends the request for querying the association state of the shared EBS volume to the cloud management platform periodically or when the active virtual machine is faulty, and the cloud management platform sends the association state of the shared EBS volume to the standby virtual machine according to the request, which is not limited in this embodiment of the present invention.

Step 102: The cloud management platform receives a request for removing an association between the active virtual machine and the shared EBS volume sent by the standby virtual machine.

Step 103: The cloud management platform removes the association between the active virtual machine and the shared EBS volume.

If the active virtual machine is faulty and therefore does not actively release control over the shared EBS volume, the cloud management platform is required to first remove the association between the active virtual machine and the shared EBS volume and then establish an association between the shared EBS volume and the standby virtual machine so as to avoid a case that both virtual machines of the virtual application two-node cluster are associated with the shared EBS volume at the same time.

Step 104: The cloud management platform receives a request for associating the shared EBS volume sent by the standby virtual machine.

Step 105: The cloud management platform associates the standby virtual machine with the shared EBS volume so that the standby virtual machine controls the shared EBS volume.

After the cloud management platform establishes the association between the shared EBS volume and the standby virtual machine, the standby virtual machine locally mounts the EBS volume using a mount (mount) command, so as to control the EBS volume and use the shared EBS volume like using a local disk.

By adopting the solution for switching over the virtual application two-node cluster in the cloud environment according to this embodiment of the present invention, the active virtual machine and the standby virtual machine acquire state information of each other using the cloud management platform. This avoids occurrence of an isolated node (the isolated node refers to a node that, when a fault such as a network fault occurs, cannot provide service externally and cannot be perceived by any other network element) and enables the standby virtual machine to acquire, when the active virtual machine is faulty and therefore cannot actively release control over the shared EBS volume, fault information in time and request the cloud management platform to release control of the active virtual machine over the shared EBS volume, so that the standby virtual machine can assume control over the shared EBS volume and a switchover from the active virtual machine to the standby virtual machine is smoothly implemented.

With reference to the method for switching over the virtual application two-node cluster in the cloud environment according to the foregoing embodiment, this embodiment discloses details of an application foundation of the foregoing solution, that is, the cloud environment.

A large number of computing devices and storage devices are managed in the cloud environment. The cloud management platform virtualizes physical resources into logical resources using a virtualization technology and further provides externally virtual computing resources (virtual machines) and virtual storage resources (for example, EBS volumes) services. For the convenience of management, the cloud management platform divides the devices into multiple regions for management. Each region has its own dedicated computing and storage devices, and resource cannot be shared across different regions.

An EBS volume is a virtual storage resource created by the cloud management platform within a specified region. The EBS volume ranges from 1 gigabyte (GB) to 1 terabyte (TB) in size and its physical storage space is provided by a storage device Network Attached Storage(NAS), Storage Area Network(SAN), or Direct Attached Storage(DAS). In a VMware (virtual machine software) virtual environment, the EBS volume is a file with a suffix of vmdk, where the file belongs to a certain VMware Virtual Machine File System (VMFS, avirtual machine file system provided by VMware) file system. In a XenServer (a Linux-based virtual server) virtual environment, the EBS volume may be a file and may also be a logical volume.

After the EBS volume is successfully created, by calling an Application Programming Interface (API), (for example, VirtualMachine. ReconfigVM_Task in the VMware virtual environment, and xenapi.VBD.plug in the XenServer virtual environment) in the virtual environment, it may be associated with any virtual machine in a same region or may be disassociated from the virtual machine. After the EBS volume is successfully associated with a virtual machine, which is equivalent to addition of a disk for the virtual machine, the virtual machine may perform all operations applicable to a physical disk on the EBS volume, such as partitioning, formatting, and file system creation. In terms of a use effect, the EBS volume is equivalent to a pluggable disk, similar to a universal serial bus(USB) drive.

In the VMware virtual environment, one EBS volume may be allocated to only one virtual machine or may be allocated to multiple virtual machines. However, in the XenServer virtual environment, one EBS volume can be allocated to only one virtual machine. In this embodiment of the present invention, EBS volumes are managed by the cloud management platform, and the following limitations may be imposed thereon: one EBS volume can be allocated to only one virtual machine at a time and can be allocated to another virtual machine only after it is successfully disassociated from the original virtual machine.

Figure 2:
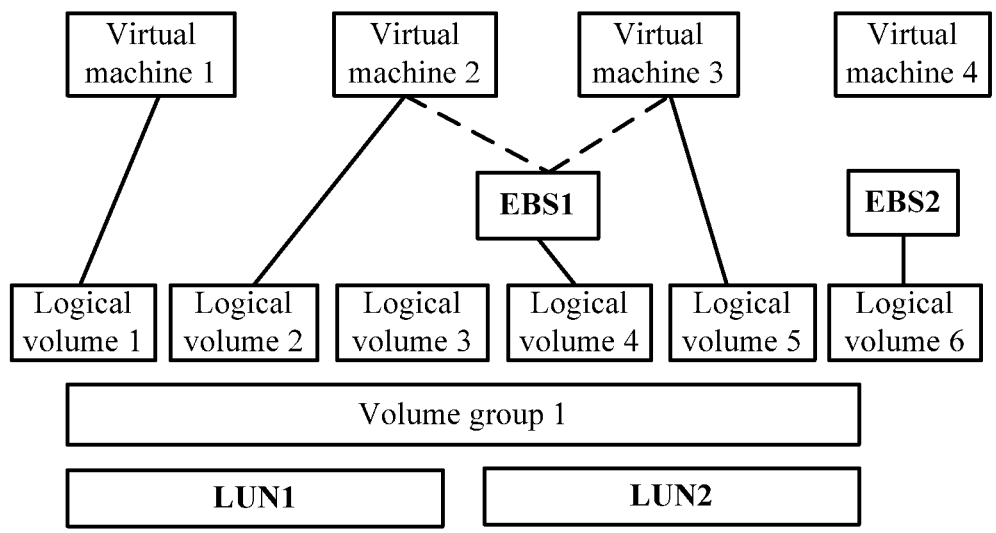
FIG. 2 is a schematic diagram of mounting an EBS volume to a virtual machine in an open source Xen virtual environment according to an embodiment of the present invention.

FIG. 2 is a schematic diagram of associating an EBS volume with a virtual machine in an open source Xen virtual environment according to an embodiment of the present invention. Associating an EBS volume with a virtual machine in a VMware virtual environment is similar to this and is not described herein again.

As shown in FIG. 2, an SAN storage system provides logical drivers (LUN1 and LUN2 shown in FIG. 2) and a cloud management platform manages a volume group and adds multiple LUNs to the volume group. When the EBS volume is created, logical volumes are divided on the volume group. One EBS volume corresponds to one logical volume (as shown in FIG. 2, an EBS1 corresponds to logical volume 4 and an EBS2 corresponds to logical volume 6). In the same way, for disks of a virtual machine, one disk corresponds to one logical volume.

As shown in FIG. 2, a virtual machine 1 is associated with a logical volume 1, a virtual machine 2 and a virtual machine 3 are virtual machines of the virtual application two-node cluster created in this embodiment of the present invention, where the EBS 1 is a shared disk of the two machines, and, according to the foregoing limitation condition on the shared EBS volume in this embodiment, can be independently associated with only the virtual machine 2 or the virtual machine 3 at a time and cannot be associated with both at the same time, and a virtual machine 4 is not associated with any disk.

Numbers of parts shown in FIG. 2 are merely used as examples and do not indicate an upper limit of (virtual) devices that the cloud management platform can manage in a region.

Figure 3:
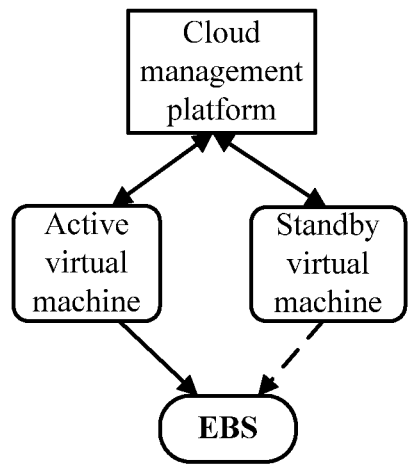
FIG. 3 is a diagram of a virtual application two-node cluster system in a cloud environment according to an embodiment of the present invention.

FIG. 3 is a diagram of a virtual application two-node cluster system in a cloud environment according to an embodiment of the present invention. The virtual application two-node cluster system in the cloud environment is different from an application two-node cluster in a physical environment in the following two aspects: 1. The application two-node cluster system in the physical environment is composed of only one active node and one standby node, while the virtual application two-node cluster system in the cloud environment according to this embodiment of the present invention includes a cloud management platform in addition to two virtual machines; 2. The active node and the standby node in the application two-node cluster system in the physical environment need to communicate with other using heartbeat information to learn a running state of the other side, while the two virtual machines of the virtual application two-node cluster in the cloud environment according to this embodiment of the present invention no longer communicate using the heartbeat information, instead, they learn the running state of each other using the cloud management platform.

As shown in FIG. 3, the two virtual machines created by the cloud management platform include an active virtual machine and a standby virtual machine, and the active virtual machine and the standby virtual machine share a disk (an EBS volume). As mentioned above, the cloud management platform may create one or more EBS volumes. The one EBS volume illustrated in FIG. 3 is merely used as an example, and the embodiment of the present invention is not limited thereto. In the cloud environment, both the virtual machine and the EBS volume are logical objects. When a physical host machine of the virtual machine is faulty, a two-node cluster relationship of the virtual machine is still saved in the cloud management platform and therefore it is necessary to specify a new physical host machine and restart the virtual machine. This is different from the two-node cluster system in the physical environment, which requires reconfiguration of the application two-node cluster.

In this embodiment of the present invention, heartbeat information is no longer required for communication between virtual machines of the virtual application two-node cluster in a cloud environment. Instead, the cloud management platform provides state information of the two application virtual machines. Relying on the full-range monitoring of virtual resources by a cloud platform, the cloud management platform in this embodiment of the present invention can conveniently acquire state information of a virtual application two-node cluster, for example, health status (such as running, stopped, or faulty) of a virtual machine, EBS volume mounting information (such as mounted or not, mounting time, and an identifier of a mounted EBS volume) of a virtual machine, and performance data (such as a central processing unit(CPU) usage and disk or network input/output(I/O) traffic) of a virtual machine.

In the existing two-node cluster solution, an object to be monitored is generally added to a resource group. The resource group provides a script for two-node cluster software in the two-node cluster to call and execute a specific task, for example, starting, stopping, or monitoring the resource group. In this embodiment of the present invention, the two-node cluster software on the virtual application two-node cluster may acquire current running states of the virtual application two-node cluster from the cloud management platform using a monitoring script to provide accurate virtual machine state information for two-node cluster monitoring. Because either machine of the virtual application two-node cluster can query state information of the other virtual machine using the cloud management platform, and because the cloud management platform has high reliability, occurrence of an isolated node can be minimized.

With reference to the content disclosed in the foregoing embodiments, this embodiment describes creation, startup, and switchover of a virtual application two-node cluster respectively in detail.

Creation of a virtual application two-node cluster in a cloud environment:

In the cloud environment disclosed in the foregoing embodiment, a user requests to create the virtual application two-node cluster via a portal of a cloud management platform and specifies a size of a shared disk (that is, an EBS volume) at the same time.

The cloud management platform creates active and standby virtual machines of a two-node cluster, that is, an active virtual machine and a standby virtual machine, and installs two-node cluster software (for example, a Veritas Cluster Server) on the active and standby virtual machines to monitor the application two-node cluster. In addition, the active virtual machine and the standby virtual machine are set to separately acquire state information of each other using the cloud management platform, for example, health status (such as running, stopped, or faulty) of a virtual machine, EBS volume mounting information of the virtual machine (such as mounted or not, mounting time, and an identifier of a mounted EBS volume), and performance data (such as a CPU usage and disk or network I/O traffic) of the virtual machine.

The cloud management platform creates one or more shared EBS volumes while creating the virtual application two-node cluster. The created shared EBS volume is set to be used by only the two virtual machines of the virtual application two-node cluster and to be independently controlled by only one virtual machine at a time.

Figure 4:
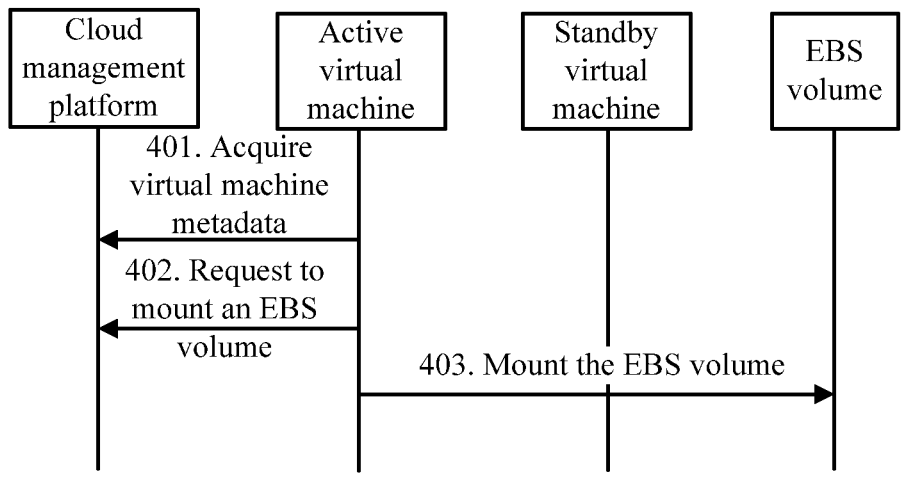
FIG. 4 is a schematic diagram illustrating steps for starting a virtual application two-node cluster in a cloud environment according to an embodiment of the present invention.

Startup of a virtual application two-node cluster in a cloud environment:

FIG. 4 is a schematic diagram illustrating steps for starting a virtual application two-node cluster in a cloud environment according to an embodiment of the present invention. With reference to FIG. 4, detailed steps are as follows:

Step 401: An active virtual machine acquires, during startup, virtual machine metadata from a cloud management platform.

The virtual machine metadata may include a virtual machine identifier(ID), IDs of EBS volumes that can be mounted to a virtual machine, IDs of mounted EBS volumes, mounting time, and the like.

Further, the active virtual machine allows a two-node cluster startup script installed on it to acquire the virtual machine metadata using a webserver service of the cloud management platform. For example, corresponding data may be acquired using a command wget http://11.22.33.44/255/meta-data/.

Step 402: The active virtual machine requests the cloud management platform to associate the shared EBS volume.

Further, the active virtual machine may initiate an AttachVolume (add volume) request using the EBS ID (EBS volume identifier) of the EBS volume, which is acquired in step 401, as a parameter and using a command-line interface (CLI) tool provided by the cloud management platform. The cloud management platform adds a disk for the active virtual machine.

The CLI tool is provided by the cloud management platform and may run on any virtual machine as long as a network connection is maintained with the cloud management platform. The cloud management platform controls the EBS volumes to ensure that one EBS volume is always controlled by only one virtual machine, thereby eliminating occurrence of a brain-split problem when an application two-node cluster is used.

In an physical two-node cluster in the prior art, when multiple shared disks need to be mounted, device names of the disks on an operating system(OS) cannot be specified and the disks can be generally distinguished by only disk sizes. In this way, it is difficult to distinguish purposes of disks with a same size.

Particularly, in an embodiment of the present invention, the cloud management platform may set a name for each EBS volume when multiple shared EBS volumes are created. In this way, when requesting for mounting an EBS volume, the virtual machine may specify the name of the EBS volume, which solves a problem that multiple shared disks cannot be distinguished in the physical two-node cluster in the prior art and can facilitate writing of a two-node cluster script and reduce problems caused by man-made errors. For example, the virtual application two-node cluster requires two shared disks, with one used to store bills and the other used to store database files. When creation of the virtual application two-node cluster is requested, two EBS volumes (EBS1 and EBS2) are requested as shared disks with planned volume names, for example, the EBS volume for storing bills may be named /dev/sdb and the EBS volume for storing database files may be named /dev/sdc.

In this case, an EBS volume mounting request may be as follows:

```
cloudcli   AttachEBS   VM1    EBS1   /dev/sdb
mount   /dev/sdb   /mnt/bill
cloudcli   AttachEBS   VM1    EBS2   /dev/sdc
mount   /dev/sdc   /mnt/dbfile
```

Step 403: The active virtual machine locally mounts the EBS volume.

After the cloud management platform associates the shared EBS volume with the active virtual machine in step 402, the active virtual machine locally mounts the EBS volume using a mount command and then can use the shared EBS volume like using a local disk.

Switchover of a virtual application two-node cluster in a cloud environment:

In this embodiment of the present invention, switchover of the virtual application two-node cluster in the cloud environment may fall into two cases: one is an active switchover from an active virtual machine to a standby virtual machine, which is initiated by the active virtual machine, and the other is a passive switchover from the active virtual machine to the standby virtual machine when a fault occurs. The following describes switchover steps of the virtual application two-node cluster in these two cases respectively.

Figure 5:
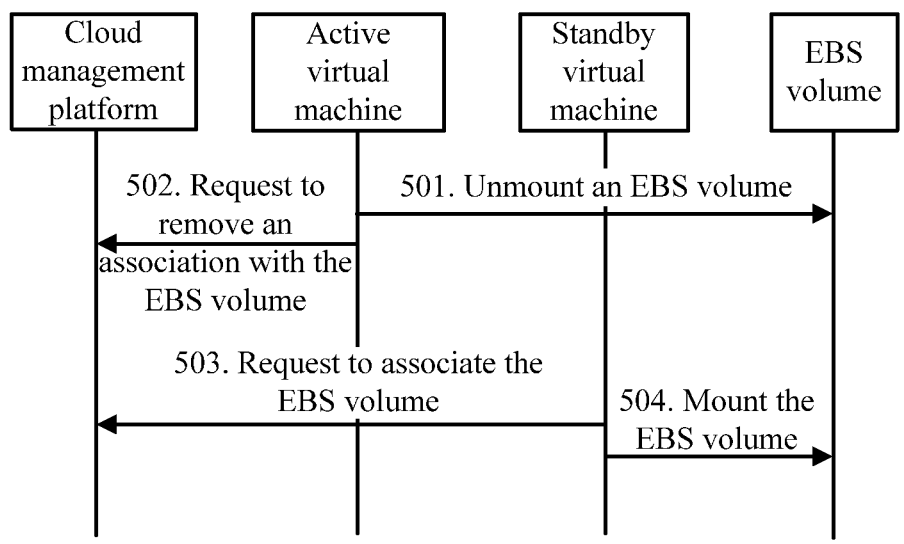
FIG. 5 is a schematic diagram illustrating active switchover steps of a virtual application two-node cluster in a cloud environment according to an embodiment of the present invention.

FIG. 5 is a schematic diagram illustrating active switchover steps of a virtual application two-node cluster in a cloud environment according to an embodiment of the present invention. The following describes the steps in detail with reference to FIG. 5.

Step 501: An active virtual machine unmounts a locally-mounted shared EBS volume.

Further, the active virtual machine may unmount the locally-mounted shared EBS volume using an unmount command.

Step 502: The active virtual machine requests a cloud management platform to remove an association with the shared EBS volume.

Further, the active virtual machine may initiate a DetachVolume request to the cloud management platform using an EBS ID of the shared EBS volume as a parameter and using a CLI tool provided by the cloud management platform, so as to remove the association with the EBS volume.

After receiving the request, the cloud management platform removes the association between the shared EBS volume and the active virtual machine.

Step 503: A standby virtual machine requests the cloud management platform to associate the shared EBS volume.

Step 504: The standby virtual machine locally mounts the EBS volume.

Operations for the standby virtual machine to establish an association with the shared EBS volume and locally mount the shared EBS volume using steps 503 and 504 are the same as the operations for the active virtual machine to associate and mount the shared EBS volume in the foregoing steps 402 and 403, and are not described herein again.

If the active virtual machine actively initiates a two-node switchover, the active virtual machine first releases control over the shared EBS volume and then performs the two-node switchover. This ensures that only one virtual machine is associated with the shared EBS volume at a time, thereby avoiding occurrence of a brain-split.

In addition, in another embodiment of the present invention, the standby virtual machine may also query, before requesting to associate the shared EBS volume, the cloud management platform for an association state of the EBS volume and then requests to associate the EBS volume only after determining that the EBS volume is not associated with another virtual machine. A step for the standby virtual machine to query the cloud management platform for an association state of an EBS volume is described in detail in a subsequent embodiment.

Figure 6:
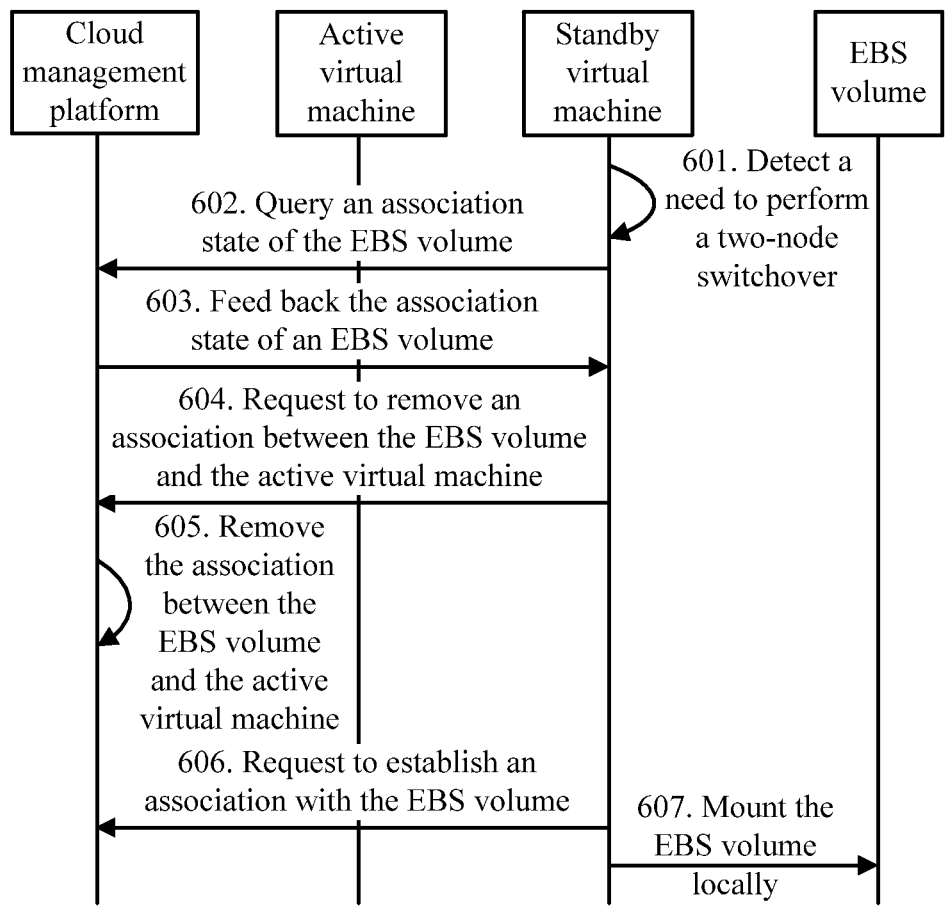
FIG. 6 is a schematic diagram illustrating passive switchover steps of a virtual application two-node cluster in a cloud environment according to an embodiment of the present invention.

In the case of passive switchover, for example, when the active virtual machine is faulty, a network connection of the active virtual machine is faulty, or a host machine of the active virtual machine is faulty, switchover from the active virtual machine to the standby virtual machine is also needed. FIG. 6 is a schematic diagram illustrating passive switchover steps of a virtual application two-node cluster in a cloud environment according to an embodiment of the present invention. The following describes the steps for passive switchover in detail:

Step 601: A standby virtual machine detects a need to perform a two-node switchover.

As above mentioned, both virtual machines of the virtual application two-node cluster have two-node cluster software installed, and the two-node cluster software acquires running states of the active and standby virtual machines from a cloud management platform using a script. In this embodiment, the two-node cluster software on the standby virtual machine may acquire a running state of the active virtual machine from the cloud management platform using a monitoring script and thereby detects that the active virtual machine is faulty and standby two-node switchover needs to be performed. Types of faults that occur include but are not limited to a fault of the active virtual machine, a network connection fault of the active virtual machine, or a host machine fault of the active virtual machine.

Step 602: The standby virtual machine queries the cloud management platform for an association state of a shared EBS volume.

When a fault occurs, the active virtual machine generally does not release control over the shared EBS volume. Therefore, before the switchover, the standby virtual machine queries the cloud management platform for the association state of the shared EBS volume and executes a corresponding operation according to the queried state.

Further, the standby virtual machine queries the cloud management platform for the association state of the shared EBS volume using a DescribeVolume command.

As above mentioned, in the case of active switchover, the standby virtual machine may also execute this step to query the association state of the shared EBS volume before associating the shared EBS volume, so that it can better avoid occurrence of a brain-split and enhancing reliability of the virtual application two-node cluster.

Step 603: The cloud management platform feeds the association state of the shared EBS volume back to the standby virtual machine.

If the shared EBS volume is still associated with the active virtual machine, step 604 is performed. If the shared EBS volume is not associated with the active virtual machine, step 606 is performed.

Step 604: The standby virtual machine requests the cloud management platform to remove an association between the active virtual machine and the shared EBS volume.

Further, the standby virtual machine may initiate a DetachVolume request to the cloud management platform using a CLI tool to remove the association between the active virtual machine and the EBS volume.

As above mentioned, the cloud management platform can conveniently acquire state information of the virtual application two-node cluster. In an embodiment of the present invention, the cloud management platform, after receiving the request for removing the association between the active virtual machine and the shared EBS volume sent by the standby virtual machine, may also first judge a state of the active virtual machine and then removes, after determining that the active virtual machine is faulty, the association between the active virtual machine and the shared EBS volume.

Step 605: The cloud management platform removes the association between the active virtual machine and the shared EBS volume.

Step 606: The standby virtual machine requests the cloud management platform to establish an association with the shared EBS volume, and the cloud management platform establishes an association between the standby virtual machine and the shared EBS volume.

Step 607: The standby virtual machine locally mounts the shared EBS volume.

Further, in the foregoing steps 606 and 607, the standby virtual machine may initiate an AttachVolume request to the cloud management platform using the CLI tool. The cloud management platform establishes the association between the standby virtual machine and the shared EBS volume and then the standby virtual machine locally mounts the EBS volume using a mount operation.

By performing the operations disclosed in this embodiment, when the active virtual machine is faulty, the standby virtual machine may acquire the association state of the shared EBS volume using the cloud management platform and performs relevant operations on this basis, which effectively reduces occurrence of the brain-split and enhances reliability of the virtual application two-node cluster. Especially in a case in which the active virtual machine is faulty and cannot actively release control over the shared EBS volume, the standby virtual machine may remove the association between the active virtual machine and the shared EBS volume using the cloud management platform, which can ensure independent control of the standby virtual machine over the shared EBS volume and ensure a smooth switchover.

With reference to the content disclosed in the foregoing embodiments, this embodiment discloses a cloud management platform that is configured to implement the switchover solution of a virtual application two-node cluster in a cloud environment disclosed in the foregoing embodiments.

Figure 7:
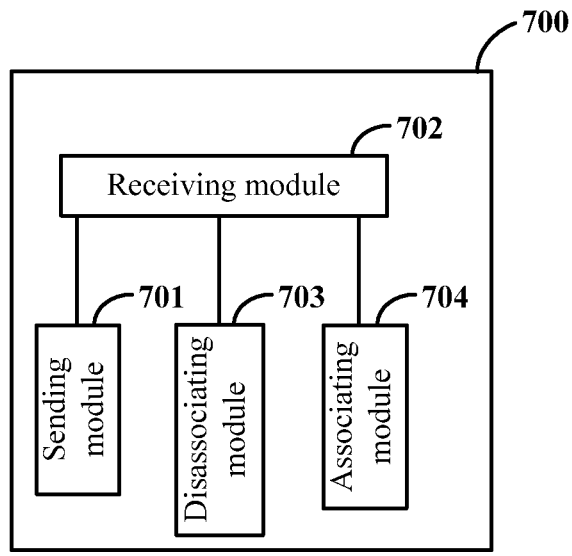
FIG. 7 is a schematic structural diagram of a cloud management platform according to an embodiment of the present invention.

FIG. 7 is a schematic structural diagram of a cloud management platform according to an embodiment of the present invention. The following describes components of the cloud management platform in detail with reference to FIG. 7.

As shown in FIG. 7, a cloud management platform 700 includes a sending module 701, a receiving module 702, a disassociating module 703, and an associating module 704.

The sending module 701 is configured to send an association state of a shared EBS volume to a standby virtual machine.

In an embodiment of the present invention, that the sending module 701 sends an association state of a shared EBS volume to a standby virtual machine may be that when an active virtual machine is faulty, the receiving module 702 receives a request for querying the association state of the shared EBS volume sent by the standby virtual machine, and the sending module 701 sends, according to the request for querying the association state of the shared EBS volume, which is received by the receiving module 702, the association state of the shared EBS volume to the standby virtual machine.

During running of a virtual application two-node cluster, when the active virtual machine is faulty, a switchover from the active virtual machine to the standby virtual machine is caused. Because a shared disk in an application two-node cluster allows being controlled by only one active machine at a time, the standby virtual machine first needs to acquire the association state of the shared EBS volume before the switchover, so as to avoid a case that both virtual machines of the virtual application two-node cluster are associated with the EBS volume.

In this embodiment of the present invention, the standby virtual machine may acquire the association state of the shared EBS volume in multiple manners. For example, the cloud management platform periodically sends association state information of the shared EBS volume to the standby virtual machine, the cloud management platform sends the association state information of the shared EBS volume to the standby virtual machine when detecting that the active virtual machine is faulty (for example, the active virtual machine is faulty, a network connection of the active virtual machine is faulty, or a host machine of the active virtual machine is faulty), or the standby virtual machine sends a request for querying the association state of the shared EBS volume to the cloud management platform periodically or when the active virtual machine is faulty, and the cloud management platform sends the association state of the shared EBS volume to the standby virtual machine according to the request, which is not limited in this embodiment of the present invention.

The receiving module 702 is configured to receive a request for removing an association between the virtual active machine and the shared EBS volume sent by the standby virtual machine.

The disassociating module 703 is configured to remove, according to the request for removing the association between the active virtual machine and the shared EBS volume, which is received by the receiving module 701, the association between the active virtual machine and the shared EBS volume.

In a case in which the shared EBS volume is still associated with the active virtual machine, the standby virtual machine needs to request the cloud management platform to remove the association between the shared EBS volume and the active virtual machine, so as to implement control of the standby virtual machine over the shared EBS volume and complete the switchover from the active virtual machine to the standby virtual machine.

The receiving module 702 is further configured to receive a request for associating the shared EBS volume sent by the standby virtual machine.

The associating module 704 is configured to associate, according to the request for associating the shared EBS volume with the standby virtual machine, which is received by the receiving module 702, the standby virtual machine with the shared EBS volume, so that the standby virtual machine controls the shared EBS volume.

Figure 8:
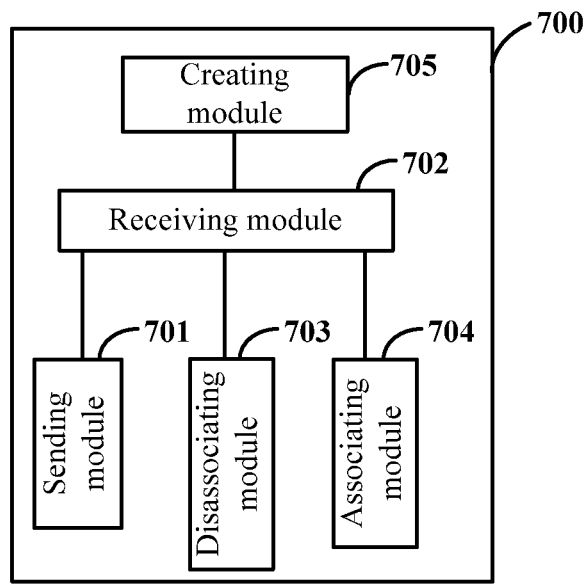
FIG. 8 is another schematic structural diagram of a cloud management platform according to an embodiment of the present invention.

With reference to FIG. 7, a cloud management platform shown in FIG. 8 further includes a creating module 705.

The creating module 705 is configured to create, according to a user request, the active virtual machine, the standby virtual machine, and the shared EBS volume, set the active virtual machine and the standby virtual machine to respectively acquire state information of each other using the cloud management platform, and set the shared EBS volume to be independently controlled by the active virtual machine or the standby virtual machine.

One or more shared EBS volumes may be created. When the creating module 705 creates more than one shared EBS volume, the creating module 705 is further configured to specify a name for each of the more than one shared EBS volume.

The receiving module 702 is further configured to receive a request for associating the shared EBS volume sent by the active virtual machine, The associating module 704 is further configured to associate, according to the request for associating the shared EBS volume with the active virtual machine, which is received by the receiving module 702, the active virtual machine and the shared EBS volume, so that the active virtual machine controls the shared EBS volume.

By adopting the cloud management platform disclosed in this embodiment, a virtual application two-node cluster and a shared EBS volume can be created according to a user request, which can meet user needs to the largest extent. During running of the virtual application two-node cluster, both an active virtual machine and a standby virtual machine may acquire running state information of each other in time using the cloud management platform. Especially when the active virtual machine is faulty, the standby virtual machine can acquire the information from the cloud management platform in time and perform corresponding operations, which avoids a case that both virtual machines access the shared disk at the same time and greatly enhances running reliability of the virtual application two-node cluster.

Figure 9:
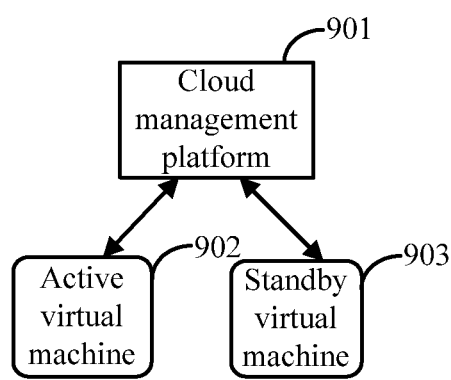
FIG. 9 is an architecture diagram of a virtual application two-node cluster system in a cloud environment according to an embodiment of the present invention.

FIG. 9 is an architecture diagram of a virtual application two-node cluster system in a cloud environment according to an embodiment of the present invention. As shown in FIG. 9, the system is configured to switch over a virtual application two-node cluster in the cloud environment and includes a cloud management platform 901, an active virtual machine 902, and a standby virtual machine 903.

The cloud management platform 901 is configured to send an association state of a shared EBS volume to the standby virtual machine 903.

In an embodiment of the present invention, that the cloud management platform 901 sends an association state of a shared EBS volume to the standby virtual machine 903 may be that when the active virtual machine is faulty, the standby virtual machine 903 sends a request for querying the association state of the shared EBS volume to the cloud management platform 901, and the cloud management platform 901 sends, as a response to the request, the association state of the shared EBS volume to the standby virtual machine 903.

During running of the virtual application two-node cluster, when the active virtual machine is faulty, a switchover from the active virtual machine to the standby virtual machine is caused. Because a shared disk in an application two-node cluster allows being controlled by only one active machine at a time, the standby virtual machine first needs to acquire the association state of the shared EBS volume before the switchover, so as to avoid a case that both virtual machines of the virtual application two-node cluster are associated with the EBS volume.

In this embodiment of the present invention, the standby virtual machine may acquire the association state of the shared EBS volume in multiple manners. For example, the cloud management platform periodically sends association state information of the shared EBS volume to the standby virtual machine, the cloud management platform sends the association state information of the shared EBS volume to the standby virtual machine when detecting that the active virtual machine is faulty (for example, the active virtual machine is faulty, a network connection of the active virtual machine is faulty, or a host machine of the active virtual machine is faulty), or the standby virtual machine sends a request for querying the association state of the shared EBS volume to the cloud management platform periodically or when the active virtual machine is faulty, and the cloud management platform sends the association state of the shared EBS volume to the standby virtual machine according to the request, which is not limited in this embodiment of the present invention.

The standby virtual machine 903 is configured to detect, according to the association state of the shared EBS volume sent by the cloud management platform 901, that the shared EBS volume is associated with the active virtual machine 902, and send a request for removing an association between the active virtual machine 902 and the shared EBS volume to the cloud management platform 901.

The cloud management platform 901 is further configured to receive the request for removing the association between the active virtual machine 902 and the shared EBS volume sent by the standby virtual machine 903, and remove the association between the active virtual machine 902 and the shared EBS volume.

The standby virtual machine 903 is further configured to send a request for associating the shared EBS volume to the cloud management platform 901.

The cloud management platform 901 is further configured to associate, according to the request for associating the shared EBS volume sent by the standby virtual machine 903, the standby virtual machine 903 with the shared EBS volume.

The standby virtual machine 903 is further configured to locally mount the shared EBS volume so as to control the shared EBS volume.

The foregoing cloud management platform 901 is further configured to create, according to a user request, the active virtual machine 902, the standby virtual machine 903, and the shared EBS volume, set the active virtual machine 902 and the standby virtual machine 903 to respectively acquire state information of each other using the cloud management platform 901, and set the shared EBS volume to be independently controlled by the active virtual machine 902 or the standby virtual machine 903.

The active virtual machine 902 is further configured to send a request for associating the shared EBS volume to the cloud management platform 901.

The cloud management platform 901 is further configured to associate, according to the received request for associating the shared EBS volume with the active virtual machine 902, the active virtual machine 902 with the shared EBS volume.

The active virtual machine 902 is further configured to locally mount the shared EBS volume so as to control the shared EBS volume.

By adopting the cloud management platform disclosed in this embodiment, a virtual application two-node cluster and a shared EBS volume can be created according to a user request, which can meet user needs to the largest extent. During running of the virtual application two-node cluster, both an active virtual machine and a standby virtual machine may acquire running state information of each other in time using the cloud management platform. Especially when the active virtual machine is faulty, the standby virtual machine can acquire the information from the cloud management platform in time and perform corresponding operations, which avoids a case that the both virtual machines access the shared disk at the same time and greatly enhances running reliability of the virtual application two-node cluster.

Through the description of the foregoing embodiments, persons skilled in the art can clearly understand that all or a part of steps in the method provided in the foregoing embodiments may be realized using a mode of software plus a necessary general hardware platform. Based on such an understanding, the technical solutions in the present invention essentially, or the part contributing to the prior art may be implemented in a form of a software product. The computer software product is stored in a storage medium, such as a read-only memory (ROM)/random access memory (RAM), a magnetic disk, and an optical disc, and includes several instructions to cause a computer device (which may be a personal computer, a server, a network device, and the like) to execute all or a part of steps of the methods described in the embodiments or some parts of the embodiments of the present invention.

It should be noted that the embodiments in the specification are described in a progressive manner. The same or similar parts in the embodiments can be understood by reference to each other. Every embodiment describes in emphasis what is different from the other embodiments. In particular, for the apparatus embodiments, since they are basically similar to the method embodiments, the apparatus embodiments are described simply, and the execution of specific functions for all units may be obtained by reference to the part of the description of the method embodiments. The preceding apparatus embodiments are only for exemplary. The units that are described as separate components may be physically separated or not be physically separated, and the components displayed as units may be or not be physical units. That is, the units or components may be located at one place or distributed on multiple network units. A part or all of the modules may be selected according to actual needs to achieve the objectives of the solutions of the embodiments. A person of ordinary skill in the art can understand and implement the embodiment without creative efforts.

In conclusion, the preceding descriptions are merely exemplary embodiments of the present invention, but are not intended to limit the scope of the present invention. Any modification, equivalent replacement, or improvement made within the spirit and principle of the present invention shall fall within the protection scope of the present invention.

What is claimed is:

1. A method for switching over a virtual application two-node cluster in a cloud environment, wherein the virtual application two-node cluster comprises an active virtual machine and a standby virtual machine, and the method comprises:
    sending, by a cloud management platform, an association state of a shared elastic block store (EBS) volume to the standby virtual machine;
    receiving, by the cloud management platform from the standby virtual machine, a request for removing an association between the active virtual machine and the shared EBS volume;
    removing, by the cloud management platform, the association between the active virtual machine and the shared EBS volume;
    receiving, by the cloud management platform from the standby virtual machine, a request for associating the shared EBS volume; and
    associating, by the cloud management platform, the standby virtual machine with the shared EBS volume so that the standby virtual machine controls the shared EBS volume.

2. The method according to claim 1, wherein sending, by the cloud management platform, the association state of the shared EBS volume to the standby virtual machine comprises:
    receiving, by the cloud management platform from the standby virtual machine, a request for querying the association state of the shared EBS volume when the active virtual machine is faulty; and
    sending, by the cloud management platform according to the query request sent by the standby virtual machine, the association state of the shared EBS volume to the standby virtual machine.

3. The method according to claim 1, wherein, before sending, by a cloud management platform, an association state of a shared EBS volume to the standby virtual machine, the method further comprises:
    creating, by the cloud management platform according to a user request, the active virtual machine, the standby virtual machine, and the shared EBS volume, wherein the active virtual machine and the standby virtual machine respectively acquire state information of each other using the cloud management platform, and wherein the shared EBS volume is independently controlled by the active virtual machine or the standby virtual machine;
    receiving a request for associating the shared EBS volume sent by the active virtual machine; and
    associating, by the cloud management platform, the active virtual machine with the shared EBS volume so that the active virtual machine controls the shared EBS volume.

4. The method according to claim 3, wherein there is more than one shared EBS volume, and wherein the method further comprises specifying a name for each of the more than one shared EBS volume when the cloud management platform creates the more than one shared EBS volume.

5. The method according to claim 4, wherein the request for associating the shared EBS volume sent by the active virtual machine comprises the name of the shared EBS volume.

6. A cloud management server configured to switch over a virtual application two-node cluster in a cloud environment, wherein the virtual application two-node cluster comprises an active virtual machine and a standby virtual machine, and wherein the cloud management server comprises:
- a processor; and
- a memory coupled to the processor;
- wherein the memory is configured to store an application program which includes instructions that enable the processor to:
  - send an association state of a shared elastic block store (EBS) volume to the standby virtual machine;
  - receive a request for removing an association between the active virtual machine and the shared EBS volume sent by the standby virtual machine;
  - remove the association between the active virtual machine and the shared EBS volume according to the request for removing the association between the active virtual machine and the shared EBS volume;
  - receive a request for associating the shared EBS volume sent by the standby virtual machine; and
  - associate the standby virtual machine with the shared EBS volume so that the standby virtual machine controls the shared EBS volume.

7. The cloud management server according to claim 6, wherein, the instructions further enable the processor to:
- receive a request for querying the association state of the shared EBS volume sent by the standby virtual machine when the active virtual machine is faulty; and
- send the association state of the shared EBS volume to the standby virtual machine according to the request for querying the association state of the shared EBS volume.

8. The cloud management server according to claim 6, wherein the instructions further enable the processor to:
- create, according to a user request, the active virtual machine, the standby virtual machine, and the shared EBS volume before sending the association state of the shared EBS volume to the standby virtual machine, wherein the active virtual machine and the standby virtual machine respectively acquire state information of each other using the cloud management server, wherein the shared EBS volume is independently controlled by the active virtual machine or the standby virtual machine; and
- associate, according to the request for associating the shared EBS volume with the active virtual machine, the active virtual machine with the shared EBS volume such that the active virtual machine controls the shared EBS volume.

9. The cloud management server according to claim 8, wherein there is more than one shared EBS volume, and wherein the instruction further enables the processor to specify a name for each of the more than one shared EBS volume when creating the more than one shared EBS volume.

10. A virtual application two-node cluster system in a cloud environment configured to switch over a virtual application two-node cluster in the cloud environment, the system comprising:
- a cloud management server configured to switch over the virtual application two-node cluster system in the cloud environment;
- an active virtual machine; and
- a standby virtual machine,
- wherein the cloud management server comprises:
  - a processor; and
  - a memory coupled to the processor, and
  - wherein the memory is configured to store an application program which includes instructions that enable the processor to:
    - send an association state of a shared elastic block store (EBS) volume to the standby virtual machine;
    - receive a request for removing an association between the active virtual machine and the shared EBS volume sent by the standby virtual machine;
    - remove the association between the active virtual machine and the shared EBS volume according to the request for removing the association between the active virtual machine and the shared EBS volume;
    - receive a request for associating the shared EBS volume sent by the standby virtual machine; and
    - associate the standby virtual machine with the shared EBS volume so that the standby virtual machine controls the shared EBS volume.

11. A method for switching over a virtual application two-node cluster in a cloud environment, wherein the virtual application two-node cluster comprises an active virtual machine and a standby virtual machine, and the method comprises:
- receiving, by the standby virtual machine, an association state of a shared elastic block store (EBS) volume sent by a cloud management server;
- sending, by the standby virtual machine, a request for removing an association between the active virtual machine and the shared EBS volume to the cloud management server, wherein the request is used to instruct the cloud management server to remove the association between the active virtual machine and the shared EBS volume; and
- sending, by the standby virtual machine, a request for associating the shared EBS volume with the standby virtual machine to the cloud management server, wherein the request is used to instruct the cloud management server to associate the standby virtual machine with the shared EBS volume.

12. The method according to claim 11, wherein the method further comprising:
- sending, by the standby virtual machine, to the cloud management server, a request for querying the association state of the shared EBS volume when the active virtual machine is faulty; and
- receiving, by the standby virtual machine, the association state of the shared EBS volume sent by the cloud management server.

13. A virtual machine for switching over a virtual application two-node cluster in a cloud environment, wherein the virtual application two-node cluster comprises an active virtual machine and a standby virtual machine, and the virtual machine comprises:
- a processor; and
- a memory coupled to the processor,
- wherein the memory is configured to store an application program which includes instructions that enable the processor to:
  - receive an association state of a shared elastic block store (EBS) volume sent by a cloud management server;
  - send a request for removing an association between the active virtual machine and the shared EBS volume to the cloud management server, wherein the request is used to instruct the cloud management server to remove the association between the active virtual machine and the shared EBS volume; and send a request for associating the shared EBS volume with the standby virtual machine to the cloud management server, wherein the request is used to instruct the cloud management server to associate the standby virtual machine with the shared EBS volume.

14. The virtual machine according to claim 13, wherein the instructions further enable the processor to:
send to the cloud management server a request for querying the association state of the shared EBS volume when the active virtual machine is faulty; and
receive the association state of the shared EBS volume sent by the cloud management server.

* * * * *